H. E. WARREN.
CONTROL SYSTEM.
APPLICATION FILED OCT. 2, 1920.
Patented June 27, 1922.
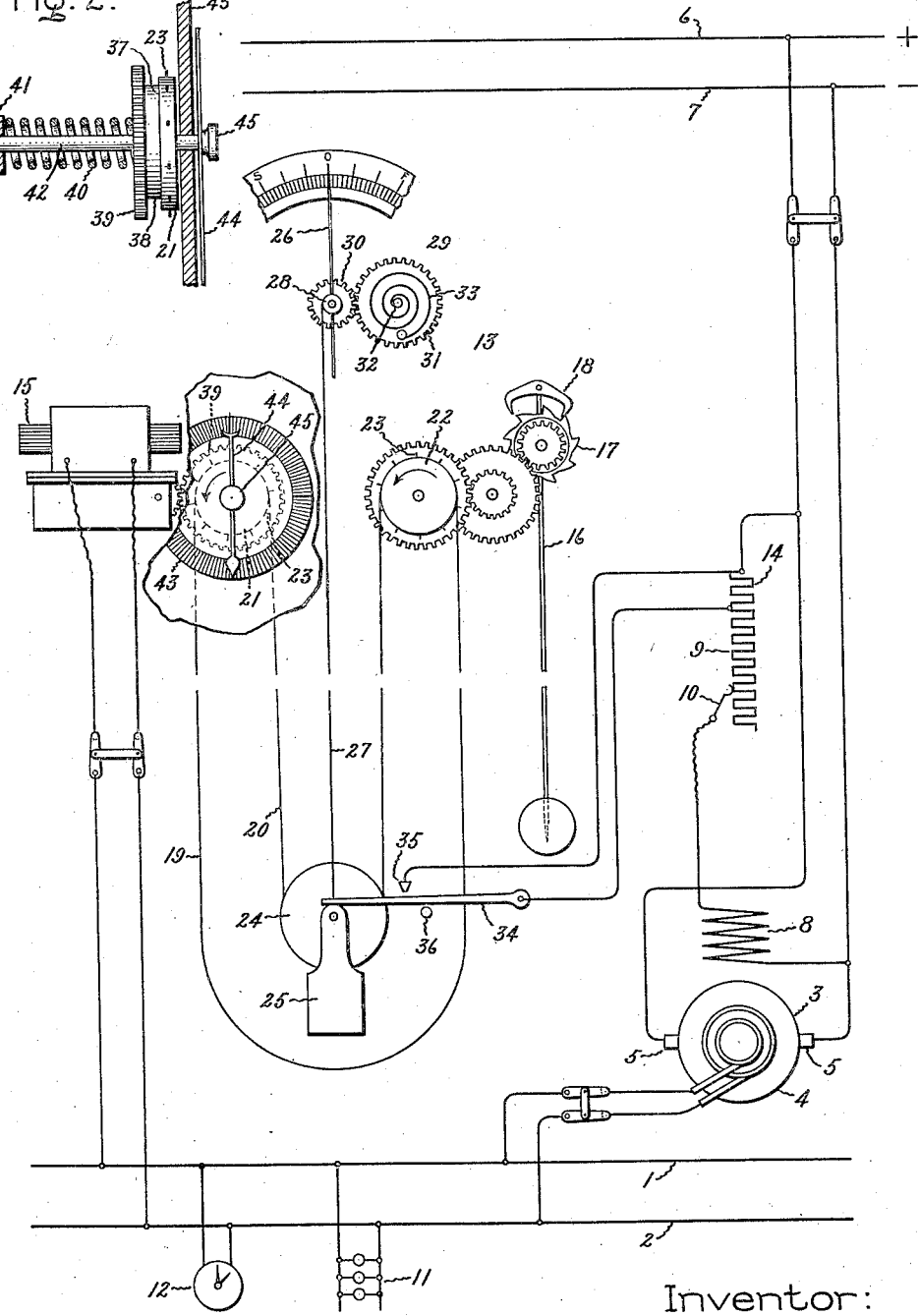
Inventor:
Henry E. Warren,
by *Albert G. Davis*
His Attorney.

UNITED STATES PATENT OFFICE.

HENRY E. WARREN, OF ASHLAND, MASSACHUSETTS, ASSIGNOR TO WARREN CLOCK COMPANY, A CORPORATION OF MAINE.

CONTROL SYSTEM.

1,420,896. Specification of Letters Patent. Patented June 27, 1922.

Application filed October 2, 1920. Serial No. 414,161.

*To all whom it may concern:*

Be it known that I, HENRY E. WARREN, a citizen of the United States, residing at Ashland, county of Middlesex, State of Massachusetts, have invented certain new and useful Improvements in Control Systems, of which the following is a specification.

My invention relates to control systems, and more particularly to speed control systems, such for example as those to which are connected, in addition to the ordinary commercial load, electrically operated secondary clocks.

In order that secondary clocks operated from a commercial source may indicate accurately, it is necessary to insure a constant rate of the indicating elements. Where the rate of the secondary clocks is directly dependent upon the speed of rotating apparatus at the central station, it is evident that a speed control system must be used for maintaining the average speed of the rotating apparatus at an absolutely uniform value. In case synchronous motor driven secondary clocks are operated from a commercial alternating current system, it is thus necessary that the average frequency be maintained at a constant value, so that the secondary clocks connected on the system may always indicate accurately, since the speed of the motors is absolutely proportional to the frequency. In many instances it is highly desirable that the regulation of the system be automatic so that no manual adjustments of speed need be made. It is the main object of my invention to provide an extremely efficient and simple controlling means for effecting this regulation.

In addition to the need for speed regulation, it is also necessary to take care of temporary interruptions in the service, so that the secondary clocks may be brought back into coincidence with an accurately adjusted time piece. This is especially important since it is impossible to safeguard totally against these temporary interruptions. There are for the most part of short duration, although there may be possibilities, very infrequently, that the interruption extends for as long a period as one or two hours. It is extremely desirable whether the interruptions be short or long, to arrange matters in such a way that upon the resumption of the service the secondary clocks may be speeded up by means of an increase in the speed of the rotating apparatus at the central station while the secondary clocks are slow, i. e. while their indications are behind that of a standard timepiece. This increase above normal rate of the secondary clocks should be effected by automatic means, thus obviating manual manipulation by the station attendants. Of course such a controlling means as, I have outlined above is especially useful where the secondary clocks are driven by self-starting synchronous motors, or by other self-starting mechanisms, such as direct current electromagnets, for then it is absolutely certain that each and all of the secondary clocks will stop and start operating at the same instant; but any clock system may embody this feature of my invention, provided it is one in which the speed of the secondary clocks depends directly upon the speed of rotating apparatus at the central station. In the case of synchronous motor driven clocks, the rotating apparatus comprises a source of alternating current, the frequency of which is to be controlled. It is thus another object of my invention to provide a controlling means whereby extended interruptions of the service may be compensated for automatically upon resumption of the service.

Various other objects and advantages of my control system will become apparent as the description proceeds.

The construction and mode of operation of my invention will be understood from the following description taken in connection with the accompanying drawing, in which Figure 1 is a diagrammatic representation of the various elements in my system together with their electrical connections; and Fig. 2 is a partial sectional view showing a mechanical detail.

Referring now more in detail to the drawing, wherein like reference characters refer to like parts throughout, I have shown a system of distribution, the mains of which are shown at 1 and 2, for supplying an ordinary commercial load 11, such as light and power, and for supplying secondary clocks indicated diagrammatically at 12. This system may be for example, an alternating current system, either single phase or polyphase. The mains 1, 2 are supplied with power from a rotating apparatus designated in general by the numeral 3. Any source of mechanical power may be used to drive the rotating apparatus, the speed of which determines the frequency of the alternating current system, and thus the rate of the clocks. In this case the motive means and the alternating current generator happen to be combined in a single structure, to form an inverted synchronous converter. A system utilizing a synchronous converter for changing direct current into alternating current at a definite frequency may find application in the distribution of time in hotels, large office buildings, etc. In such places it is quite common to have an isolated plant for supplying the light and power, comprising a direct current dynamo operated by a prime mover. Under such circumstances it is more convenient to operate a converting apparatus instead of using a separate prime mover. The synchronous converter, which is brought into mechanical rotation from the direct current mains, may then be made of a very small size for operating the clocks alone, or sufficiently large to operate other forms of load also. An inverted synchronous converter has certain advantages over a motor generator set, which advantages may here be pointed out. With a synchronous converter, it is absolutely immaterial so far as the speed of the machine is concerned what the alternating current voltage is. The value of the alternating current voltage is a function simply of the direct current voltage. It is true that the speed of the rotating apparatus, in this case the rotary converter 3, is usually maintained at a very even speed, but it may become necessary as pointed out before to increase temporarily the speed of the apparatus in order that the secondary clocks may gain their lost time. Under such circumstances with an ordinary alternating current generator a voltage regulating means would be necessary. With my invention, however, such voltage regulating means may be dispensed with, since there is no variation of voltage due simply to the variation of speed. With self-starting synchronous motor driven secondary clocks, it is especially important that the voltage applied to the synchronous motors be held fairly constant, for otherwise the synchronous motors may fall temporarily out of step.

The direct current source of supply, which connects to the brushes 5, 5 of the synchronous converter 3 are shown by the mains 6 and 7 and labeled respectively plus and minus. The stationary exciting field coils 8 of the synchronous converter are also adapted to be supplied from the direct current mains 6 and 7, and the amount of current flowing therethrough may be determined by manually setting the variable resistance 9 by means of contact 10. In order that the secondary clocks 12 may indicate accurately, it is necessary to maintain the average frequency of the alternating current system, or the average speed of the rotating apparatus 3, at an absolutely uniform value. To perform this function I make use of a regulating apparatus shown in general at 13. In this instance the speed regulation is obtained by varying the constants of the direct current net-work of the converter; for example, by varying the resistance in the field circuit as by short-circuiting or open-circuiting the section 14 of the resistance 9 connected in series with the field coil 8. Although in this instance, I have shown but one section of the resistance 9 adapted to be short-circuited, it is evident that a plurality of such sections operated in succession may be used for speed regulation if desired. Furthermore, this regulation is so arranged that the speed of the converter 3 is a trifle fast when the resistance 14 is in circuit and a trifle slow when the resistance 14 is out of circuit. The change in speed of the converter 3 occurs at fairly frequent intervals, and depends upon how much the secondary clocks must gain or lose to set into operation the regulating means. Thus if the resistances 9 and 14 are properly chosen, the controlling means may be inactive to change the speed of the converter for as long as five or ten minutes. Of course it is possible to change this interval by varying the constants of the circuit, should it be necessary.

The regulating apparatus 13 is dependent for its action upon the comparison of the speed of the converter 3 and of a standard timepiece which has been accurately adjusted. The speed of the converter 3 is duplicated in the apparatus 13 by means of the small synchronous motor 15 adapted to be supplied from the mains 1, 2 and here shown as of the self-starting type, such as shown for instance, in various Letters Patent granted to me, No. 1,283,432; 1,283,433; and 1,283,435, and assigned to the same assignee as the present application. The standard timepiece in this instance comprises the pendulum 16, scape-wheel 17 and pawl 18. In order to compare the speeds of the synchronous motor 15 and the standard timepiece, I make use of an endless flexible member such as a belt or chain 19, having a loop 20 therein and adapted to be driven at one point by means of the synchronous motor 15 and at another point adapted to be advanced in accordance with the speed of the standard timepiece. The particular transmission between the motor and the flexible member will be later described. By appropriate gearing, the belt or chain 19, which is made of such flexible material as a steel strip or of links, and which is prevented from slipping over the driving pulleys 21 and 22 by means of pins 23 engaging the belt or chain, is allowed to be advanced by the standard timepiece at the same rate as it is being driven by the synchronous motor 15, when the speed of this motor is at the correct value. In this way the length of the loop 20 stays constant, provided the speed of the converter 3 is at the proper value; and this length furthermore may be used as an indication of the accumulated excess in time of the secondary clocks over the indication of the standard timepiece or vice-versa. I have not shown the indicating apparatus actuated by the standard timepiece but it is evident that hands and a dial may be provided for this purpose. It is evident also that should the average frequency vary, the length of the loop 20 as measured from corresponding points at the driving pulleys 21 and 22 would vary from normal and this would show a non-coincidence of indications of the secondary clocks and of the standard timepiece. It is furthermore evident that other means for duplicating the motion of the rotating apparatus 3 in the apparatus 13 may be utilized for moving endless flexible member 20 instead of the synchronous motor 15, but the means I have shown is advantageous when it is desired to have the regulating apparatus at a considerable distance from the rotating apparatus or converter 3, since by this means actual mechanical connection between converter 3 and regulating apparatus 13 is obviated. The directions of rotation of the synchronous motor 15 and of the shafts driven or advanced by the standard timepiece are such that the loop lengthens when the synchronous motor 15 stops or rotates too slowly. The proper direction of rotation of the driven pulleys 21 and 22 is shown by the arrows thereon. With this arrangement it is not essential to use a spring for keeping the pendulum going, since the requisite energy for doing this is obtained from motor 15 through the mechanical connections between the motor and the timepiece.

Located within the loop 20 is the sheave 24 which may act as a weight, or if this be insufficient an extra weight or movable member 25 may be added, suspended on the shaft of the sheave 24. This weight serves to keep the pendulum going even after an interruption in the service because it descends and gives up its potential energy to the pendulum through the intermediate mechanical connections. As shown in my prior patents referred to above, the motor 15 has an irreversible drive somewhere in its train of gears, such as a worm and wheel, whereby it is impossible for the movable member or weight 25 to rotate the motor backwards when the motor stops. It is evident that the length of the loop 20, as well as the position of movable member 25, is a function of the variation in time between the secondary clocks and the standard timepiece. I utilize this variation in length for performing the regulating functions. I may also in addition employ an indicator 26 for determining the variation between the secondary clocks and the standard timepiece. In this case the pointer is moved in response to variations in length of the loop 20 by means of a flexible connection or cord 27 joined at one end to the axle of the sheave 24 and at the other end to the drum 28 which carries the pointer. In order to keep the flexible element taut at all times, a spring take-up 29 is utilized comprising a spur gear 30 rigidly fastened to the drum 28 and a spur gear 31 loosely mounted on stationary shaft 32. Rigidly fastened at its inner end to the shaft 32 is a helical spring 33 of comparatively light construction. The outer end of this spring is fastened to the gear 31. It is evident that this helical spring 33 acts to stretch the member 27 at all times. The means for indicating the variation in time as shown by the secondary clocks from that of the standard timepiece is not claimed in this application but is described and claimed in an application filed in my name, Serial No. 397,920, filed July 21, 1920, entitled "Time indicating apparatus" and assigned to the same assignee as the present invention.

As has been stated heretofore, the variation in length of the loop 20 may be utilized in any well known manner for effecting the regulation of the speed of the converter 3. In this instance the rise and fall of the movable member 25 is made use of to make and break certain electrical contacts. For this purpose I show a member 34 adapted to be tilted to perform this function. This member may be a mercury contact tube, and I show this member as the pivoted lever 34 simply for ease of illustration, forming one contact, co-operating with stationary contact 35. When the sheave 24 and weight 25 rises, which shows that the secondary clocks are fast, a contact is made between the lever 34 and the stationary contact point 35. The contacts thus made serve to short-circuit section 14 of the resistance 9 included in the field circuit of the converter 3. It is of course to be understood that although I have shown this action taking place without any intermediary apparatus, in many instances it may be advisable to relay this action so that the current flowing through the field circuit need not traverse the contacts carried by the tiltable member 34. Such modifications are immediately obvious to a skilled electrician and need not be described in any great detail. The short-circuiting of the resistance 14 causes the field of the converter 3 to be more strongly energized, and therefore the speed drops. Upon dropping of the speed the loop 20 lengthens and the contact is broken between 34 and 35. When contact is broken the resistance 14 is inserted in the field circuit and the speed of the converter 3 is correspondingly greater than normal. The result is that the loop 20 is again shortened and contact between 34 and 35 is again completed. This action of course goes on indefinitely at comparatively short intervals, such as five or ten minutes for a cycle of operations, and the integrated frequency of the system which is dependent on the speed of the rotating apparatus 3 is maintained at the proper value. A stop pin 36 serves to limit the downward movement of the tiltable member 34, in case the loop 20 lengthens due to an interruption in the service. While I have shown a control system as applied to a synchronous converter, obvious modifications may be made use of to vary the speed of prime movers driving alternating current generators or rotating apparatus in general, operated by a variation in the length of the loop 20. It is evident that it is possible to arrange matters so that the tiltable member 34 does not interfere with the free movement of the member 25. The function of member 25 is merely to tilt this tiltable member 34 either up or down, as it moves up or down, away from normal or central position.

One of the greatest advantages resulting from the use of my system is that the movable member or weight 25 may move downward upon a lengthy interrupation in service without causing any damage or other abnormal condition of the apparatus. Assume for example that there is an interruption of an appreciable length of time in the service or that there have been several such interruptions in a short period of time; the movable weight 25 is then entirely disengaged from the tiltable member 34 and contact between this member and the contact 35 is open. The effect of the interruption of the service is merely to allow the weight 25 to descend and it may keep on descending for an appreciable time as much as a few hours. Now, when the current is turned on again upon a resumption in service, the conditions are such that the converter 3 has a speed higher than normal since resistance 16 is inserted in the field circuit until the tiltable member 34 is re-engaged by the movable member 25 when the length of the loop becomes normal, and this tiltable member is made to contact with the point 35, short-circuiting the section 14. Of course it is to be understood that other well known regulating means may be utilized for speed variation.

As shown most clearly in Fig. 2, the motor 15 or other device which duplicates the movement of the secondary clocks 12, transmits its motion to the flexible member 19 through a clutch, preferably an ordinary friction clutch comprising the two engaging faces 37, one being formed on the driving pulley 21, and the other on the disc 38 rigidly held to the gear 39 forming one of the gear elements of the motor drive. The two faces of the clutch are pressed into engagement by a helical compression spring 40, the left hand end of which engages the collar 41 rotating with the shaft 42, which carries the pulley 21. It is to be understood that gear 39 and the disc 38 may freely rotate upon this shaft when the two faces of the friction clutch are not in operative engagement.

The form of transmission described has the important advantage that it makes possible a manual adjustment of the length of the loop 20 by rotating the pulley 21. An example where manual adjustment of the loop length is important occurs when it is desirable to set by hand all of the secondary clocks ahead or behind by a certain amount. To set the clocks ahead, it is necessary to lengthen the loop by the proper amount; and to set the clocks behind it is necessary to shorten the loop by the proper amount. Shortening or lengthening the loop will cause the clocks to be slowed down or speeded up until the loop length becomes normal, in a manner described hereinbefore. The setting of the secondary clocks in the manner described may be necessary when the system is just installed, and also when the secondary clocks are to be set to comply with so-called daylight saving laws.

For ascertaining accurately how much the loop is shortened or lengthened, I make use of appropriate indicating means, such as a dial 43 with which a pointer 44 cooperates. The dial is appropriately marked in minutes and seconds, and is carried by the face of the clock. The pointer 44 is fastened to the shaft 42 and rotates therefore in unison with the pulley 21. A knob 45 is provided, as shown, for rotating the pulley 21 manually. While the synchronous motor 15 is rotating, the hand 44 also rotates. When a manual adjustment is to be made, the knob 45 is quickly turned against or with the movement of the pointer 44 any given number of seconds, as shown on the dial 43. It is of course evident that manual setting is very rarely needed, since ordinarily once the secondary clocks are in step with the standard timepiece, they will remain in step in the normal operation of the system.

While I have shown in the accompanying drawing but one embodiment of my invention, I do not wish to be limited thereto, but aim to embrace in the appended claims all modifications falling fairly within the scope of my invention.

What I claim as new and desire to secure by Letters Patent of the United States, is:—

1. In a system for the indication of time by means of secondary clocks driven by self-starting synchronous motors, a standard timepiece, and means for bringing the indications of the secondary clocks into coincidence with that of the standard timepiece after an interruption in the service, comprising means for increasing the speed of the synchronous motors above their normal rate while the secondary clocks are slow, said means being rendered active by the non-coincidence of the indications of the secondary clocks and the standard timepiece.

2. In a system for the indication of time by means of secondary clocks driven by synchronous motors supplied from rotating apparatus the speed of which determines the frequency of the system, means for causing the secondary clocks to indicate accurately comprising an accurately adjusted timepiece, means for controlling the speed of said rotating apparatus so that it may rotate either slow or fast as compared with the speed necessary to obtain correct indications, and means whereby the effect of said controlling means is determined by the difference in the indications between the secondary clocks and the timepiece.

3. In a system for the distribution of time by means of secondary clocks driven by self-starting synchronous motors, a standard timepiece, and means for bringing the indications of the secondary clocks into coincidence with that of the standard timepiece after one or more interruptions in the service, each of appreciable duration, comprising means active upon a resumption in the service for increasing the speed of said secondary clocks above their normal rate until they indicate accurately.

4. In a system for the indication of time by means of secondary clocks driven by self-starting synchronous motors supplied from rotating apparatus, the speed of which determines the frequency of the system, a standard timepiece, and means for bringing the indications of the secondary clocks into coincidence with that of the standard timepiece after an interruption in the service of appreciable duration, comprising means active upon a resumption in the service for increasing the speed of said rotating apparatus above its normal rate until the secondary clocks indicate accurately.

5. In a system for the indication of time by means of secondary clocks driven by self-starting synchronous motors, a standard timepiece and means for bringing the indications of the secondary clocks into coincidence with that of the standard timepiece after one or more interruptions in the service, each of appreciable duration comprising an endless flexible member forming a loop of normal length when the secondary clocks indicate correctly, means whereby the length of said loop is made a function of the variation in the time of the secondary clocks from the standard timepiece, and means active upon a resumption of the current and while the length of said loop is not normal, for increasing the speed of said secondary clocks.

6. In a system for the indication of time by means of electrically operated secondary clocks supplied from rotating apparatus, the speed of which determines the rate of the secondary clocks, a standard timepiece, and means for bringing the indications of the secondary clocks into coincidence with that of the standard timepiece after one or more interruptions in the service, each of appreciable duration, comprising means active upon a resumption of the service for increasing the speed of said apparatus above its normal rate until the secondary clocks indicate correctly.

7. In a system for the indication of time by means of synchronous motor driven secondary clocks supplied from rotating apparatus, the speed of which determines the frequency, means for causing the secondary clocks to indicate accurately after an interruption of appreciable duration in the operation of said rotating apparatus, said means comprising an accurately adjusted timepiece, an endless flexible member, means for driving said member in synchronism with the rotating apparatus, means for causing said member to be advanced at another place in synchronism with the movement of the timepiece, whereby the length of the member included between the places where it is being advanced by said two latter means is a function of the variation in time between the secondary clocks and the adjusted timepiece, and means for varying the speed of the rotating apparatus, said means being acutated in response to a variation in said length.

8. In a system for the indication of time by means of secondary clocks driven by self-starting synchronous motors supplied for rotating apparatus, the speed of which determines the frequency of the system, means for causing the secondary clocks to indicate accurately comprising an accurately adjusted timepiece, a movable member, means for determining the position of said member in accordance with the accumulated excess of indications of the accurately adjusted timepiece over that of the secondary clocks, or vice versa, and means actuated by the movable member for varying the speed of the rotating apparatus.

9. In a system for the indication of time by means of secondary clocks driven by self-starting synchronous motors, means for causing the secondary clocks to indicate accurately, comprising an accurately adjusted timepiece, a direct current source, a synchronous converter fed therefrom, supplying alternating current to the secondary clocks, a movable member, means for determining the position of said member in accordance with the accumulated excess of indications of the accurately adjusted timepiece over that of the secondary clocks or vice versa, and means actuated by the movable member for carrying the constants of the direct current network of the converter whereby its speed may be varied.

10. In a system for the indication of time by means of synchronous motor driven secondary clocks supplied from rotating apparatus, the speed of which determines the frequency of the system, means for causing the secondary clocks to indicate accurately, comprising an accurately adjusted timepiece, a movable member, means for determining the position of said member in accordance with the accumulated excess of indications of the accurately adjusted timepiece over that of the secondary clocks or vice versa, and means controlled by said movable member for varying the speed of the rotating apparatus so as to make it either fast or slow as compared with the speed necessary for correct indication.

11. In a system for the indication of time by means of electrically operated secondary clocks supplied from rotating apparatus, the speed of which determines the rate of the secondary clocks, a standard timepiece, and means for bringing the indications of the secondary clocks into coincidence with that of the standard timepiece after one or more interruptions in the surfave, each of appreciable duration, comprising a movable member, means for determining the position of said member in accordance with the amount of time that the secondary clocks are behind the standard timepiece, and means operated by said movable member and active upon a resumption of the service for increasing the speed of said rotating apparatus above its normal rate until the secondary clocks indicate correctly.

12. In a system for the indication of time by means of electrically operated secondary clocks supplied from rotating apparatus, the speed of which determines the rate of the secondary clocks, means for causing the secondary clocks to indicate accurately after an interruption of appreciable duration in the operation of said rotating apparatus, said means comprising an accurately adjusted timepiece, an endless flexible member, means for driving said member in synchronism with the rotating apparatus, means for causing said member to be advanced at another place in synchronism with the movement of the timepiece, whereby the length of the member included between the places where it is being advanced by said two latter means is a function of the variation in time between the secondary clocks and the adjusted timepiece, and means for varying the speed of the rotating apparatus, said means being actuated in response to a variation in said length.

13. In a system for the indication of time by means of electrically operated secondary clocks supplied from rotating apparatus, the speed of which determines the rate of the secondary clocks, means for causing the secondary clocks to indicate accurately comprising an accurately adjusted timepiece, a movable member, means for determining the position of said member in accordance with the accumulated excess of indications of the accurately adjusted timepiece over that of the secondary clocks, or vice versa, and means actuated by the movable member for varying the speed of the rotating apparatus.

14. In a speed control system for rotating apparatus, an accurately adjusted timepiece, an endless flexible member, means for driving said member in synchronism with the rotating apparatus, means for causing said member to be advanced at another place in synchronism with the movement of the timepiece, whereby the length of the member included between the places where it is being advanced by said two latter means is a measure of the number of revolutions lost or gained by said rotating apparatus due to abnormal variations in speed of appreciable duration, and means for varying the speed of the rotating apparatus, said means being actuated in response to a variation in said length.

15. A system for the indication of time by means of electrically operated secondary clocks wherein the indications of the secondary clocks are compared with that of a standard timepiece, characterized by the fact that the non-coincidence of these indications is made use of after an interruption in the service of an appreciable duration for speeding up the clocks until they indicate accurately.

16. A system for the indication of time by means of secondary clocks driven by self-starting synchronous motors wherein the indications of the secondary clocks are compared with that of a standard timepiece, characterized by the fact that the non-coincidence of these indications is made use of after an interruption in the service of an appreciable duration for increasing the frequency of the current supplied to the clocks until they indicate accurately.

17. In a speed control system for rotating apparatus, an accurately adjusted timepiece, an endless flexible member, means for driving said member in synchronism with the rotating apparatus, means for causing said member to be advanced at another place in synchronism with the movement of the timepiece, whereby the length of the member included between the places where it is being advanced by said two latter means is a measure of the number of revolutions lost or gained by said rotating apparatus due to abnormal variations from normal speed, means for varying the speed of the rotating apparatus actuated in response to a variation in said length, and means for manually varying the length of said member included between the places where it is being advanced.

18. In a system for the indication of time by means of electrically driven secondary clocks supplied with current from rotating apparatus the speed of which determines the rate of the clocks, an accurately adjusted timepiece, means for varying the speed of said rotating apparatus, said means being normally set in operation by the variation of the time indications between the secondary clocks and the standard timepiece, and means for manually causing said speed varying means to operate until the secondary clocks gain or lose a predetermined amount.

19. In a system for the indication of time by means of electrically driven secondary clocks, an accurately adjusted timepiece, an endless flexible member forming a loop, means for momentarily causing a variation in the rate of the secondary clocks from that of the standard timepiece to vary the normal length of the loop, means for varying the rate of the clocks for appreciable durations of time in response to a variation from the normal length of the loop, and manual means for independently varying the length of said loop.

In witness whereof, I have hereunto set my hand this 29th day of Sept., 1920.

HENRY E. WARREN.

Certificate of Correction.

It is hereby certified that in Letters Patent No. 1,420,896, granted June 27, 1922, upon the application of Henry E. Warren, of Ashland, Massachusetts, for an improvement in "Control Systems," errors appear in the printed specification requiring correction as follows: Page 1, line 48, for the word "There" read *These;* page 5, line 109, claim 7, for the misspelled word "acutated" read *actuated;* page 6, line 10, claim 9, for the word "carrying" read *varying;* same page, line 38, claim 11, for the misspelled word "surfave" read *service;* and that the said Letters Patent should be read with these corrections therein that the same may conform to the record of the case in the Patent Office.

Signed and sealed this 8th day of August, A. D., 1922.

[SEAL.]

KARL FENNING,

*Acting Commissioner of Patents.*